United States Patent [19]

Cross et al.

[11] Patent Number: 5,097,602
[45] Date of Patent: Mar. 24, 1992

[54] APPARATUS AND METHOD FOR AUTOMATED INSPECTION OF A SURFACE CONTOUR ON A WORKPIECE

[75] Inventors: Michael Cross, Monroeville; Albert B. Cady, Plum Boro, both of Pa.

[73] Assignee: Westinghouse Electric Corp., Pittsburgh, Pa.

[21] Appl. No.: 348,938

[22] Filed: Jul. 9, 1990

[51] Int. Cl.⁵ .................................. G01B 5/20
[52] U.S. Cl. .................................. 33/551; 33/553; 33/549; 33/556; 33/569; 33/573; 33/502
[58] Field of Search .......... 33/551, 552, 553, 549, 33/550, 555.1, 557, 501.4, 501.09, 554, 555, 556, 558, 569, 568, 501.14, 502, 1 M, 572, 573, 546, 545

[56] References Cited

U.S. PATENT DOCUMENTS

| | | | |
|---|---|---|---|
| 1,364,834 | 1/1921 | Walter | 33/552 |
| 2,765,538 | 10/1956 | Field et al. | 33/573 |
| 2,775,039 | 12/1956 | Price | 33/552 |
| 2,782,521 | 2/1957 | Parker et al. | 33/550 |
| 3,534,396 | 10/1970 | Hart et al. | 235/61.6 |
| 3,791,039 | 2/1974 | Allix | 33/573 |
| 3,855,523 | 12/1974 | Pirlet | 33/550 |
| 4,212,031 | 7/1980 | Schmitt et al. | 358/101 |
| 4,295,198 | 10/1981 | Copeland et al. | 364/515 |
| 4,301,470 | 11/1981 | Pagany | 358/101 |
| 4,352,125 | 9/1982 | Guth | 358/101 |
| 4,364,086 | 12/1982 | Guth | 358/101 |
| 4,413,277 | 11/1983 | Murray | 358/93 |
| 4,477,754 | 10/1984 | Roch et al. | 318/568 |
| 4,481,533 | 11/1984 | Alzmann et al. | 358/101 |
| 4,513,366 | 4/1985 | Munikata et al. | 364/167 |
| 4,521,860 | 6/1985 | Kanematsu et al. | 364/464 |
| 4,538,177 | 8/1985 | Morison | 358/101 |
| 4,550,374 | 10/1985 | Meshman et al. | 364/490 |
| 4,630,381 | 12/1986 | Sakata et al. | 33/1 M |
| 4,677,474 | 6/1987 | Sato et al. | 350/101 |
| 4,706,360 | 11/1987 | Callen, Jr. et al. | 33/554 |
| 4,716,657 | 1/1988 | Collingswood | 33/561 |
| 4,859,817 | 8/1989 | Cassani | 33/561 |
| 4,914,827 | 4/1990 | Cook | 33/552 |

FOREIGN PATENT DOCUMENTS 0184902  11/1982  Japan .................. 33/573

Primary Examiner—William A. Cuchlinski, Jr.
Assistant Examiner—William C. Dowling

[57] ABSTRACT

An inspection apparatus for measuring a surface contour on a workpiece, such as a groove in a pilgering roller die, includes a supporting mechanism for rotatably clamping the die so as to orient the groove thereon in a measurement position, an elongated contact member having a pair of arms with end elements extending in opposite directions, a pair of measurement devices each including a displaceable contact probe and electrical circuitry for measuring the displacement of the contact probe, and a spindle mounting the contact member in a generally vertical orientation and for movement about a vertical axis. End elements on the contact member arms are movable along orthogonally-disposed axes lying in horizontal planes and are respectively placed in contact with a contour of the die groove to be measured and the displaceable contact probes such that displacement of the probes permits measurement of the radius of the groove contour.

12 Claims, 2 Drawing Sheets

APPARATUS AND METHOD FOR AUTOMATED INSPECTION OF A SURFACE CONTOUR ON A WORKPIECE

CROSS REFERENCE TO RELATED APPLICATION

Reference is hereby made to the following copending application dealing with related subject matter and assigned to the assignee of the present invention: "High Strength Cemented Carbide Dies And Mandrels For A Pilgering Machine" by Francis Cellier et al, assigned U.S. Ser. No. 063,038 and filed Aug. 17, 1987 (W.E. 52,981).

BACKGROUND OF THE INVENTION

1. Field of the Invention

The present invention relates generally to workpiece contour inspection and, more particularly, is concerned with an apparatus and method for automated inspection of a surface contour on a workpiece, such as a circumferential groove on a roller die of a cold-pilgering machine use in fabricating nuclear fuel rod tubes.

2. Description of the Prior Art

Cold-pilgering is a conventional process by which a tube is advanced over a stationary mandrel and simultaneously compressed using two opposing roller dies resulting in the reduction of the cross-sectional area and in elongation of the tube. Reduction is effected in both the diameter and wall thickness of the tube by means of the tapered shape of the mandrel and the circumferential tapered profile of grooves in the roller dies which embrace the tube from above and below the mandrel and roll in a constant cycle back and forth along the tube.

Each roller die is manufactured using a conventional hot isostatic pressing process. The grooves are machined to their final contoured profile using a conventional electric discharge machining method and/or diamond wheel grinding technique followed by a polishing operation. Then, to ensure that the tubes will be fabricated with their wall thicknesses and diameters meeting precise specifications, the groove contour of the newly-fabricated roller dies are inspected prior to use. Also, used roller dies are inspected after certain periods of use.

Heretofore, these inspections have been performed by trained operators manually making groove contour measurements. As a result, the reliability of die inspections are subject to variances caused by the different degrees of care taken by different operators and also their different levels of skill. Consequently, a need exists for an improved technique for reducing or eliminating operator involvement in the inspection process.

SUMMARY OF THE INVENTION

The present invention provides an inspection apparatus and method designed to satisfy the aforementioned needs. The apparatus and method of the present invention provide for automated inspection of a workpiece surface contour, such as a circumferential groove on a cold-pilgering machine roller die, eliminating involvement by the operator in performance of the multiplicity of measurements which are made to carry out the inspection. These measurements are documented and presented, upon operator request, in one of three forms: (1) overall workpiece profile, (2) individual contours at selected coordinates, and (3) discrete datum points of contour. The inspection process can be carried out more reliably and in shorter time and provide precise documentation of the surface profile.

Accordingly, the present invention is directed to an inspection apparatus for measuring a surface contour on a workpiece, such as a groove on a roller die. The inspection apparatus comprises: (a) means for supporting the workpiece so as to orient a surface contour thereon in a position for measurement; (b) an elongated contact member having a pair of arms with end elements extending in opposite directions; (c) at least one and preferably a pair of measurement devices each including a displaceable contact probe and electrical means for measuring the displacement of the contact probe; and (d) means mounting the contact member in a generally vertical orientation and for movement of the end elements on the arms thereof in planes containing first and second orthogonally-disposed axes and to place the end elements respectively in contact with the surface contour on the workpiece to be measured and one or the other of the displaceable contact probes of the measurement devices.

In one measuring mode, the contact member is rotated by drive means of the apparatus about a vertical axis so as to move the end element of one contact member arm contacting the workpiece surface contour through a predetermined reference path and correspondingly move the end element of the other contact member arm contacting the probe of one of the measurement devices and cause displacement of the probe such that the measurement device measures deviation of the surface contour from the predetermined reference path.

On the other hand, in an alternate measuring mode, the supporting means which supports the workpiece along a horizontal axis is operable for rotating the workpiece about the horizontal axis such that the end element of the one contact member arm contacting the workpiece follows the surface contour thereof and causes the end element of the other contact member arm contacting the probe of the measurement device to correspondingly move and cause displacement of the probe such that the measurement device measures deviation of the surface contour from a predetermined reference path.

The present invention is also directed to an inspection method for measuring a surface contour on a workpiece. The inspection method comprises the steps of: (a) supporting a workpiece so as to orient a surface contour thereon in a position for measurement; and (b) mounting an elongated contact member in a generally vertical orientation and for movement of end elements on opposite arms thereof in planes containing first and second orthogonally-disposed axes and to place the end elements respectively in contact with the workpiece surface contour and at least one displacement measurement probe.

In one measuring mode, the contact member is rotated about a vertical axis so as to move the end element of one contact member arm contacting the workpiece surface contour to be measured through a predetermined reference path and correspondingly move the end element of the other contact member arm contacting the probe and cause displacement thereof such that deviation of the surface contour from the predetermined reference path can be measured.

On the other hand, in an alternate measuring mode, the workpiece is rotated about a horizontal axis such that the end element of the one contact member arm contacting the workpiece follows the surface contour thereof and causes the end element of the other contact member arm contacting the probe of the measurement device to correspondingly move and cause displacement of the probe such that the measurement device measures deviation of the surface contour from a predetermined reference path.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which.

DETAILED DESCRIPTION OF THE INVENTION

Figure 1:
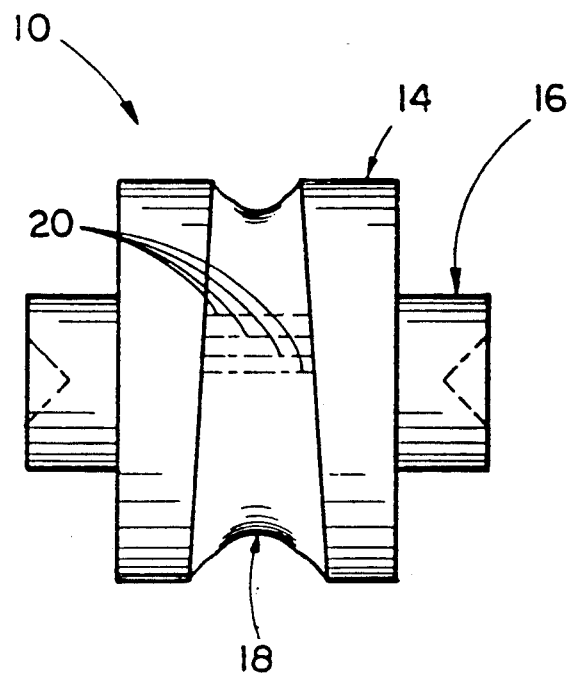
FIG. 1 is a side elevational view of a cold-pilgering roller die, an arbor mounting the die and a circumferential groove on the die which is the contoured surface being measured by the inspection apparatus in FIG. 3.

In the following description, like reference characters designate like or corresponding parts throughout the several views of the drawings. Also in the following description, it is to be understood that such terms as "forward", "rearward", "left", "right", "upwardly", "downwardly", and the like, are words of convenience and are not to be construed as limiting terms.

In General

Figure 3:
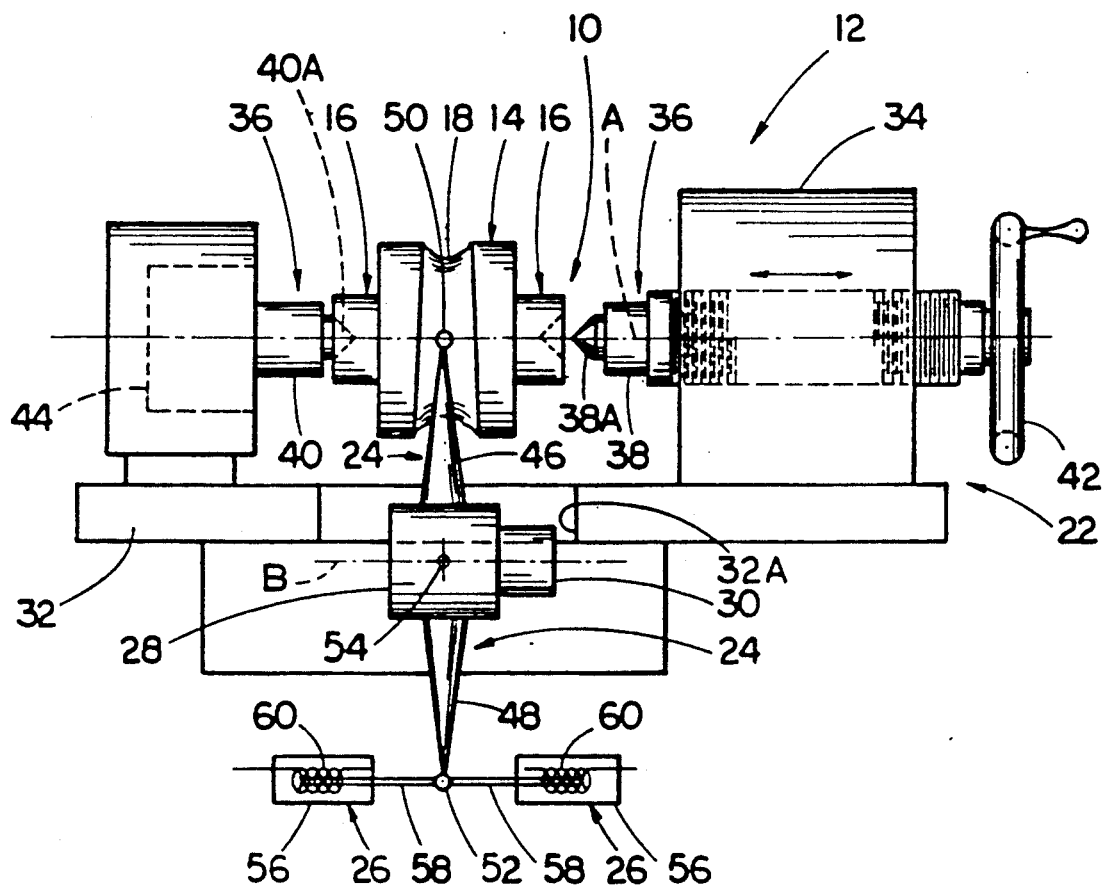
FIG. 3 is a schematical side elevational view of the workpiece contour inspection apparatus in accordance with the present invention.

Referring now to the drawings, and particularly to FIG. 1, there is illustrated a contoured workpiece 10 to be inspected by the inspection apparatus 12 of the present invention shown in FIG. 3. By way of example, the workpiece 10 illustrated is in the form of a prior art cylindrical roller die 14 typically employed in a cold-pilgering machine for fabricating nuclear fuel rod tubes. However, it should be understood that the inspection apparatus 12 can be advantageously employed with other contoured workpieces.

In addition to the roller die 14, the workpiece 10 also includes a cylindrical arbor 16 which mounts the roller die 14. Typically, the roller die 14 is heated before being placed on the arbor 16 so that when it cools a tight fit is formed between the roller die and arbor. The roller die 14 has a circumferential groove 18 defined on its periphery which constitutes the contoured surface being measured by the inspection apparatus 12 of FIG. 3. Unlike heretofore, the inspection is carried out with the die 14 mounted on the arbor 16 as they will be used in the pilgering machine so that any inaccuracies that might otherwise be introduced by the arbor 16 will be discovered at the time of the inspection.

Figure 2:
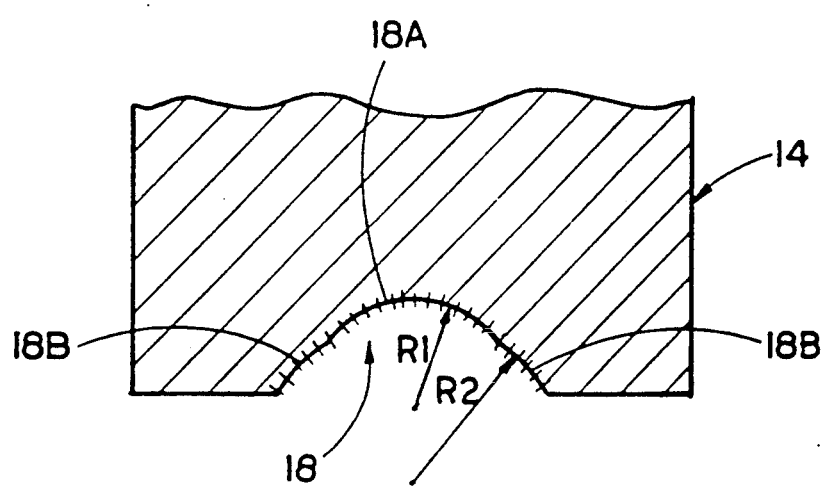
FIG. 2 is an enlarged cross-sectional view of the groove in the die of FIG. 1 which is the contoured surface being measured by the inspection apparatus in FIG. 3.

As seen in FIGS. 1 and 2, the groove 18 has an overall tapered profile which produces reduction in diameter and cross-sectional thickness of the tube. The tapered profile of the groove 18 can be viewed as a multiplicity of gradually varying successive transverse arcuate contours, as represented by dashed lines 20 in FIG. 1, progressing from a maximum width and depth to a minimum width and depth about the groove 18. As best seen in FIG. 2, each of the transverse arcuate contours 20 of FIG. 1 is described by an inner tube-engaging portion 18A of the groove 18 and an outer tube-relief portion 18B thereof. The portions 18A, 18B of the groove 18 at each contour 20 have different radii $R_1$, $R_2$, with the radius $R_2$ of the tube-relief portion 18B being longer than the radius $R_1$ of the tube-engaging portion 18A. It is the successive contours 20 defining the overall profile of the inner tube-engaging portion 18A that are the more important in terms of dimensional accuracy in fabricating the tube to the degree of dimensional precision required.

Inspection Apparatus of the Present Invention

Turning now to FIG. 3, there is illustrated the workpiece contour inspection apparatus 12 constructed in accordance with the principles of the present invention. Basically, the inspection apparatus 12 includes means 22 for supporting the roller die 14, an elongated contact member 24, at least one and preferably a pair of measurement devices 26, a spindle 28 mounting the contact member 24, and a drive mechanism 30 for rotating the contact member 24.

The supporting means 22 of the inspection apparatus 12 supports the roller die 14 along a horizontal axis A to orient its groove 18 in position for measurement as will described below and for easy observation by an operator monitoring the inspection process. The supporting means 22 includes a base plate 32 having a central opening 32A and an upright support structure 34 disposed on one end portion of the plate 32 at one side of the opening 32A.

The supporting means 22 of the inspection apparatus 12 also includes a clamping mechanism 36 having a manually movable clamping part 38 rotatably mounted to the upright support structure 34 and a stationary clamping part 40 mounted on an opposite end portion of the plate 32 at the opposite side of the opening 32A. The clamping parts 38, 40 have workpiece-engaging elements 38A, 40A which are configured to mate with opposite ends of the arbor 16 mounting the roller die 14. The movable clamping part 38 also has a handle 42 for use by the operator in rotatably retracting and extending the movable clamping part 38 away from and toward the stationary clamping part 40, and the roller die 14 when positioned between the clamping parts 38, 40, for actuating the clamping mechanism 36 between an opened unclamping and closed clamping conditions for permitting insertion/removal of the roller die 14 to/from, and clamping of the roller die 14 at, the measurement position shown in FIG. 3.

The supporting means 22 of the inspection apparatus 12 further includes a rotary drive mechanism 44 incorporated in the stationary clamping part 40 and mounting the one workpiece-engaging element 40A. The other workpiece-engaging element 38A is mounted to the movable clamping part 38 for free rotation relative thereto. Thus, when the roller die 14 is clamped between the clamping parts 38, 40 of the clamping mechanism 36, operation of the rotary drive mechanism 44 transmits rotary motion causing rotation of the roller die 14 at the measurement position.

For performing automated inspection of the clamped roller die 14, the elongated contact member 24, the measurement devices 26 and the spindle 28 are employed by the inspection apparatus 12. The contact member 24 has a pair of upper and lower pointers or arms 46, 48 rigidly connected together at their inner ends and extending in opposite directions. At their outer ends, the upper and lower arms 46, 48 have respective workpiece-contacting and measurement device-contacting elements 50, 52 in the form of small balls or spheres which are necessarily identical in dimension. The outer end elements 50, 52 of the opposite arms 46, 48 of the contact member 24 are disposed at the same distance from a center point 54 at which the contact member is pivotally mounted to the spindle 28. The measurement devices 26 of the inspection apparatus 12 each includes a housing 56 mounting a reciprocably displaceable contact probe 58 and electrical means 60 such as a coil for generating analog signals representing a measurement of the displacement of the contact probe 58.

The spindle 28 of the inspection apparatus 12 is a conventional device per se which is movable along x-y-z orthogonal axes by operation of suitable means such as stepping motors to set the contact member 24 at desired initial positions matched with different sizes of workpieces and to permit movement of the contact member 24 for making measurements. The spindle 28 is disposed between the oppositely-extending upper and lower pointers or arms 46, 48 of the contact member 24 and mounts the contact member 24 in a generally vertical orientation, as seen in FIG. 3, for making measurements with the outer end element 50 of the upper arm 46 of the contact member 24 biased in engagement with the groove contour 20 to be measured. The center point 54 of the contact member 24 is located on a horizontal axis B which is the x-axis of the spindle 28 and extends parallel to the horizontal axis A about which the roller die 14 is rotated by the supporting means 22. The spindle 28 is adjustable along the vertical direction, or z-axis, to initially place the outer end element 50 of the upper contact member arm 46 in contact with the die 14 at the particular contour 20 of its groove 18 which lies in the horizontal plane containing the horizontal axis A of rotation of the die 14. The spindle 28, by being movable along x-and y-axes, permits the outer end element 50 of the upper contact member arm 46 to move in the horizontal plane along first and second orthogonally-disposed axes which are parallel to the x- and y-axes of the spindle. The outer end element 52 of the lower contact member arm 48 will concurrently engage the displaceable contact probes 58 of the measurement devices 26 and move one or the other of the probes. By having the contact member 24 mounted vertically as opposed to horizontally, more accuracy is afforded because the contact member 24 is not now stressed (deflected) by the force of gravity.

The inspection apparatus 12 is capable of measuring the profile of the die groove 18 in two different modes. In one measuring mode, the die 14 is disposed stationary while a set of radii measurements are made representing the die's contour at this position, and then rotatably indexed (approximately two degrees) to the next position. As seen in FIG. 2, each contour 20 is comprised of a set of radii measurements (multiplicity of spaced points) which yields the contour measurement. Then, measurement of the succession of contours 20, seen in FIG. 1, yields the overall profile of the die groove 18. The spindle 28, contact member 24 and measurement devices 26 are attached to a rotary table in an orthogonal orientation such that the plane determined by spindle 28, contact member 24, and measurement devices 26 (radius measurement plane) is rotatable about the vertical or z-axis such that each point of radius measurement can be addressed from a common center point.

During each radius measurement the spindle 28, and thus the contact member 24, is rotated by the drive mechanism 30 of the apparatus, being mounted in drivingly coupled relation to the spindle 28, about an axis orthogonal to the radius measurement plane, located at the center point 54, so as to move the outer end element 50 of the upper contact member arm 46 contacting the die groove contour 20. Concurrently, the outer end element 52 of the lower contact member arm 48 contacting the probe 58 of one of the measurement devices 26 moves and causes displacement of the probe 58 such that the electrical means 60 of the measurement device measures the radius of the die groove contour 20. This measuring mode also provides for addressing portions 18A, 18B of the groove 18 at each contour 20 having radii R1 and R2, see FIG. 2. Each set of contour measurements consist of two subsets of data, one from R1 and one from R2. Therefore each time a contour is measured, correction for each radii, or arcs, takes place by suitably indexing appropriate drive mechanism.

In the other measuring mode, the die 14 is rotated continuously about the horizontal axis A at a slow constant speed with the drive mechanism 30 rendered inoperative. In this mode, the measurement is taken circumferentially about the groove 18 instead of transversely across the groove as before. However, the outer end elements 50, 52 of the upper and lower contact member arms 46, 48 are respectively engaged with the die 14 and measurement devices 26 as before, out the groove 18, instead of transversely across the groove. The end element 50 of the upper contact member arm 46 follows the surface of the groove 18 and the end element 52 of the lower contact member arm 48 displaces one of the probes 58 such that the electrical means 60 of the measurement device 24 measures the radius of the die groove circumferential contour. After each measurement is completed, the drive mechanism 30 is operated to rotate and index the spindle 28 and thereby the contact member 24 for measuring an adjacent circumferential contour of the groove.

In view of the above description, it is understood that one application of the inspection apparatus 12 is a part of an automated die inspection system. Not shown, the automated system also employs a personal computer, an interactive multimedia video display, programmable motion controller, bidirectional serial communications link and a digital gauging apparatus. Also, the automated system includes interactive menu-driven touch screen activated software control of all system activities including continuous display of on-going system operation and status, programmable workpiece profiles, system diagnostics, training and help facilities which are presented in various forms using a multimedia display, i.e. graphics, video, and synthesized speech, and various utilities for disk filing, plotter and printer management.

It is thought that the present invention and many of its attendant advantages will be understood from the foregoing description and it will be apparent that various changes may be made in the form, construction and arrangement thereof without departing from the spirit and scope of the invention or sacrificing all of its material advantages, the form hereinbefore described being merely a preferred or exemplary embodiment thereof.

We claim:

1. An inspection apparatus for measuring a surface contour on a workpiece, comprising:
   (a) means for supporting a workpiece so as to orient a surface contour thereon in a position for measurement;
   (b) an elongated contact member having a pair of arms extending in opposite directions, each of said arms having an end element thereon;
   (c) at least one measurement device including a displaceable contact probe and electrical means for measuring the displacement of said contact probe;
   (d) means disposed between said pair of oppositely-extending arms of said contact member and mounting said contact member in a generally vertical orientation and for movement of said oppositely-extending arms of said contact member and said end elements there with in planes containing first and second orthogonally-disposed axes and to place said end elements respectively in contact with the surface contour on the workpiece to be measured and said displaceable contact probe of said measurement device; and
   (e) means for rotating said contact member about a vertical axis so as to move said end element of one contact member arm contacting the workpiece surface contour and corresponding move said end element of said other contact member arm contacting said probe of said measurement device and cause displacement of said probe such that said measurement device measures the radius of the surface contour.

2. The apparatus as recited in claim 1, wherein said supporting means includes:
   a clamping mechanism actuatable between an opened unclamping and closed clamping condition for permitting insertion and removal of the workpiece and positioning thereof at said measurement position.

3. The apparatus as recited in claim 2, wherein said supporting means further includes:
   a rotary mechanism for engaging the workpiece at said measurement position and transmitting rotary motion thereto for rotatably moving the workpiece relative to said end element of said one contact member arm contacting said workpiece surface contour.

4. The apparatus as recited in claim 1, wherein said end elements of said opposite arms of said contact member are disposed at the same distance from a center point of said contact member.

5. The apparatus as recited in claim 1, further comprising:
   a pair of said measurement devices being disposed on opposite sides of said end element of said other contact member arm.

6. The apparatus as recited in claim 1, wherein said contact member mounting means also mounts said contact member for movement along a third axis extending normal to said first and second orthogonally-disposed axes.

7. The apparatus as recited in claim 1, wherein said movement of said end element of said contact member arm contacting the workpiece surface contour to be measured is an arcuate-shaped path.

8. An inspection apparatus for measuring a surface contour on a workpiece, comprising:
   (a) means for supporting a workpiece along a horizontal axis so as to orient a surface contour thereon in a position for measurement, said supporting means being operable for rotating the workpiece about the horizontal axis;
   (b) an elongated contact member having a pair of arms extending in opposite directions, each of said arms having an end element thereon;
   (c) at least one measurement device including a displaceable contact probe and electrical means for measuring the displacement of said contact probe; and
   (d) means disposed between said pair of oppositely-extending arms of said contact member and mounting said contact member in a generally vertical orientation and for movement of said oppositely-extending arms of said contact member and said end elements there with in planes containing first and second orthogonally-disposed axes and to place said end elements respectively in contact with the surface contour on the workpiece to be measured and said displaceable contact probe of said measurement device such that, as the workpiece is rotatably moved about its horizontal axis, said end element of said one contact member arm contacting the workpiece follows the surface contour thereof and causes said end element of said other contact member arm contacting said probe of said measurement device to correspondingly move and cause displacement of said probe such that said measurement device measures the radius of the surface contour.

9. The apparatus as recited in claim 8, wherein said supporting means includes:
   a clamping mechanism actuatable between an opened unclamping and closed clamping condition for permitting insertion and removal of the workpiece and positioning thereof at said measurement position.

10. The apparatus as recited in claim 8, wherein said end elements of said opposite arms of said contact member are disposed at the same distance from a center point of said contact member.

11. The apparatus as recited in claim 8, further comprising:
   a pair of said measurement devices being disposed on opposite sides of said end element of said other contact member arm.

12. The apparatus as recited in claim 8, wherein said contact member mounting means also mounts said contact member for movement along a third axis extending normal to said first and second orthogonally-disposed axes.

* * * * *